(12) United States Patent
Jayakumar et al.

(10) Patent No.: US 11,537,568 B1
(45) Date of Patent: Dec. 27, 2022

(54) EFFICIENT DATA PROCESSING FOR SCHEMA CHANGES

(71) Applicant: Workday, Inc., Pleasanton, CA (US)

(72) Inventors: Muthukumarappa Jayakumar, San Ramon, CA (US); Ashrita Battepati, Dublin, CA (US); Don Rudish, Mountain House, CA (US); Patrick Kirby, Livermore, CA (US)

(73) Assignee: Workday, Inc., Pleasanton, CA (US)

( * ) Notice: Subject to any disclaimer, the term of this patent is extended or adjusted under 35 U.S.C. 154(b) by 168 days.

(21) Appl. No.: 16/367,065

(22) Filed: Mar. 27, 2019

(51) Int. Cl.
*G06F 16/21* (2019.01)
*G06F 16/242* (2019.01)
*G06F 16/2458* (2019.01)
*G06F 16/2453* (2019.01)

(52) U.S. Cl.
CPC .......... *G06F 16/213* (2019.01); *G06F 16/219* (2019.01); *G06F 16/2445* (2019.01); *G06F 16/2477* (2019.01); *G06F 16/24535* (2019.01); *G06F 16/24545* (2019.01)

(58) Field of Classification Search
CPC ............. G06F 16/213; G06F 16/24545; G06F 16/2445; G06F 16/2477; G06F 16/24535
See application file for complete search history.

(56) References Cited

U.S. PATENT DOCUMENTS

2009/0248638 A1* 10/2009 Hughes ............... G06F 16/2477
2009/0271699 A1* 10/2009 Peters ................. G06F 40/177
715/255
2019/0095817 A1* 3/2019 Ma ....................... G06F 16/951

* cited by examiner

*Primary Examiner* — William B Partridge
*Assistant Examiner* — Erich Alexander Fischer
(74) *Attorney, Agent, or Firm* — Van Pelt, Yi & James LLP (57) ABSTRACT

A system for processing database data includes an interface and a processor. The interface is configured to receive a query for the database data comprising a date range and a data selection criterion. The processor is configured to determine a set of fields of the database data corresponding to a most recent date of the date range; determine a subset of the set of fields of the database data specified by the data selection criterion; determine a set of transformations, where each transformation of the set of transformations corresponds to a field of the subset and a sub-range of the date range; transform the database data to determine transformed database data using the set of transformations; and select data from the transformed database data using the data selection criterion to determine a query response.

21 Claims, 8 Drawing Sheets

EFFICIENT DATA PROCESSING FOR SCHEMA CHANGES

BACKGROUND OF THE INVENTION

A database system stores data accumulated over time. For example, a database system stores human resources system data, financial system data, log data, user data, behavior data, etc. The database system provides functionality for adding new data, searching within the stored data, building reports based on the data, etc. The database system stores data according to a schema describing a set of fields (e.g., table columns) recorded over a set of recording instances (e.g., table rows). Over time, the database system administrator can change the schema—for example, determining that an additional data field is necessary, that a data field type should change, that a data field label should change, that a data field is no longer necessary, etc. After the schema is modified new data is recorded according to the new schema. In the event a database search is requested including data recorded using multiple different schemas, data recorded using the different schemas need to be reconciled so they can be directly compared. This creates a problem where comparing large data sets recorded using different schemas is very time consuming and inefficient.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for processing database data comprises an interface configured to receive a query for database data comprising a date range and a data selection criterion, and a processor configured to determine a set of fields of the database data corresponding to a most recent date of the date range, determine a subset of the set of fields of the database data specified by the data selection criterion, determine a set of transformations, wherein each transformation of the set of transformations corresponds to a field of the subset and a sub-range of the date range, transform database data to determine transformed database data using the set of transformations, and select data from the transformed database data using the data selection criterion to determine a query response. In some embodiments, the system for processing database data comprises a memory coupled to the processor and configured to provide the processor with instructions.

A system for processing database data comprises a system for storing database data and querying database data. Database data comprises any appropriate database data—for example, human resources system data, financial system data, log data, data in a tabular format, user data, behavior data, etc. Database data is associated with a schema describing a set of data fields, each field associated with a data type and a name. Data is stored for each field each time data is collected and stored. The database data can be searched, for example, by selecting a date range and one or more fields. A search can additionally include one or more data filters. For example, a financial transactions database can be searched for deposit transaction data collected from Jan. 1, 2018 through Jan. 31, 2018 with deposit value greater than $1000.

Over time, modifications to the database schema are desired. For example, additional fields are required, fields are removed, field name or data type is modified, etc. After the schema is modified, new data is stored according to the new schema (e.g., data associated with new fields are stored, data associated with removed fields are not stored, data is stored according to the modified data type, etc.). Additionally, a transformation is stored associated with the transition from the previous schema to the new schema. The transformation comprises a transformation for transforming data associated with the previous schema to data associated with the new schema. For example, the transformation comprises commands for transforming data types, creating new empty data fields, removing data fields, etc.

In the event a search of the database system is performed using a date range including one or more schema changes, the data must be made consistent before it can be searched. Making the data consistent comprises using the transformations to bring all data to use the same schema. For example, all data is brought to use the schema associated with the time at the end of the date range of the search. This task of converting the schema is both time consuming and can be processor intensive.

To make the processing more efficient, only the search involved data is converted to be consistent. In the system disclosed, for each sub-range of the date range of the search associated with a distinct schema, a data transformation is determined comprising the combination of the schema transformations from the schema of the sub-range to the schema of the end of the date range of the search. For example, in the event there are two schema changes between the start date of the date range of the search and the end date of the date range of the search, a schema transformation is determined for data associated with the sub-range from the start date of the search to the date of the first schema change in the date range of the search. The schema transformation comprises the schema transformation associated with the first schema transformation in the date range of the search followed by the schema transformation associated with the second schema transformation in the date range of the search. In the event that there are N transformations, all N transformations are combined for time range associated with the search request. In order to improve processing efficiency, a set of fields of interest is determined prior to the transformation determination. The set of fields of interest comprises the set of fields of the schema at the end of the date range of the search accessed by the data selection of the search. When determining a schema transformation for a date sub-range, only the subset of the schema transformation associated with the set of fields of interest is included. Data processing for determination of a schema transformation for other fields and for transformation outside of the date range are eliminated.

Once a schema transformation is determined for each sub-range of the date range of the search, data for the fields of interest for each sub-range is transformed using the transformation and stored in a temporary memory. The stored data comprises the database data of the fields of interest and the date range transformed to have a consistent schema. Data selection and filtering of the query is performed on the stored data to generate a query result.

Figure 1:
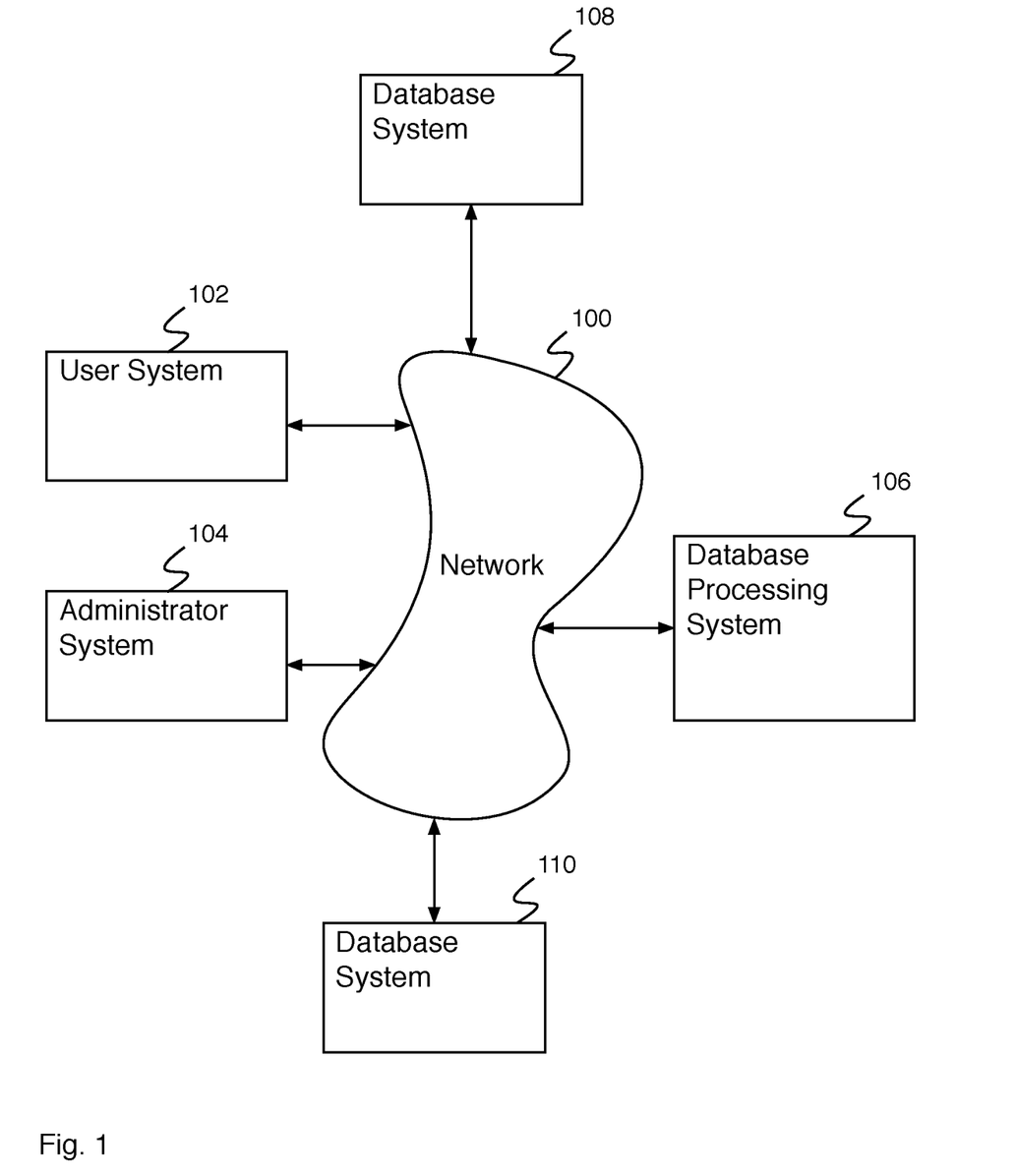
FIG. 1 is a block diagram illustrating an embodiment of a network system.

The system improves a computation system by reducing the computation load for a search of a database. The ability to make data schema compatible for search in a targeted manner enables the database to be managed and improved over time and allows for compatibility between different schema used in the database at different times. In some cases, the transformations are reduced enough to be able to be handled in real-time for a query search. In some embodiments, the real-time processing is handled in parallel. The system also improves a computation system by reducing storage requirements as the database data is not permanently upgraded between different schema but rather it is transformed in a targeted manner to be processed for the search query. Importantly, the stored database data is not altered; it is not changed in part or in whole. This also means that the any associated data or metadata for the database are also not changed including schema, schema defaults, other defaults, or any other associated metadata, FIG. 1 is a block diagram illustrating an embodiment of a network system. In some embodiments, the network system of FIG. 1 comprises a network system for a database processing system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, database processing system 106, and database system 108 communicate via network 100. User system 102 comprises a user system for use by a user. For example, a user using user system 102 is associated with a tenant—for example, an organization client of tenanted database system 108. User system 102 stores and/or accesses data on database system 108. A user uses user system 102 to interact with database system 108, for example, to store database data, to request database data, to create a report based on database data, to create a document, to access a document, to execute a database application, etc. Administrator system 104 comprises an administrator system for use by an administrator. An administrator utilizes administrator system 104 to administrate a network system—for example, installing applications, configuring applications, configuring an operating systems, modifying user privileges, etc. Database system 108 comprises a first database system for storing data—for example, human resources system data, financial system data, log data, data in a tabular format, user data, behavior data, etc. In some embodiments, database system 108 comprises a database system for storing data using the Apache Hadoop Distributed File System (e.g., HDFS). Database system 110 comprises a second database system for storing data—for example, human resources system data, financial system data, log data, data in a tabular format, user data, behavior data, etc. In some embodiments, database system 110 comprises a database system for storing data using the Apache Hadoop Distributed File System (e.g., HDFS). For example, database system 108 and database system 110 comprises database systems storing data associated with different users, data associated with different data types (e.g., financial data, human resources data, manufacturing data, procurement data, etc.), data associated with different times (e.g., at a point in time data storage switches from database system 108 to database system 110), etc.

Database processing system 106 comprises a system for processing data stored by database system 108 and database system 110. For example, database processing system 106 comprises a system for searching data, filtering data, transforming data, storing data, etc. In some embodiments, database processing system 106 comprises a system for processing data using Apache Hive and/or Apache Spark. In some embodiments, the database query is received using a Hive structured query language (SQL) syntax.

For example, database processing system 106 comprises a system for receiving a query for database data comprising a date range and a data selection criterion, determining a set of fields of the database data corresponding to a most recent date of the date range, determining a subset of the set of fields of the database data specified by the data selection criterion, determining a set of transformations, wherein each transformation of the set of transformations corresponds to a field of the subset and a sub-range of the date range, transforming database data to determine transformed database data using the set of transformations, and selecting data from the transformed database data using the data selection criterion to determine a query response.

Figure 2:
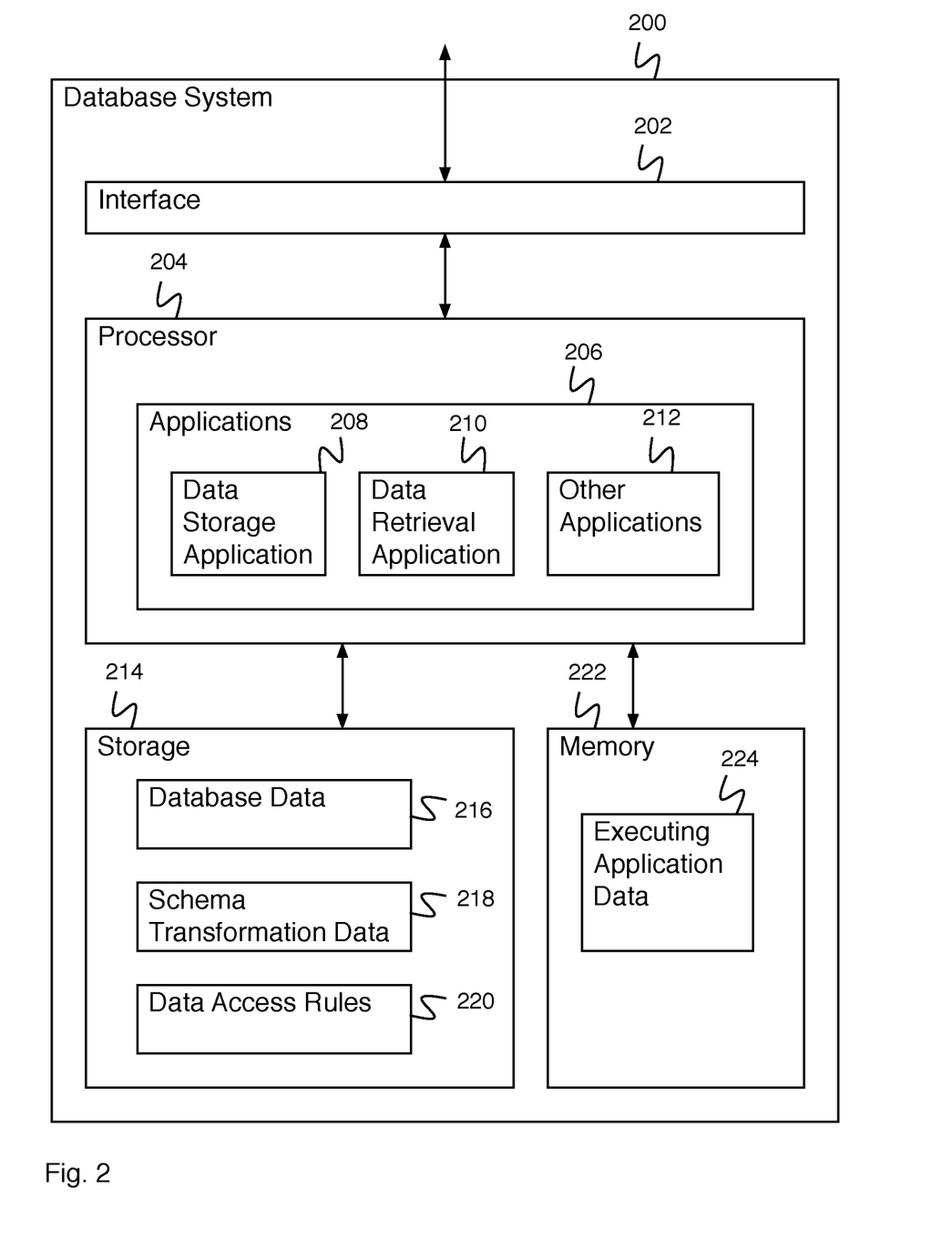
FIG. 2 is a block diagram illustrating an embodiment of a database system.

FIG. 2 is a block diagram illustrating an embodiment of a database system. In some embodiments, database system 200 comprises database system 108 of FIG. 1. In the example shown, database system 200 comprises interface 202. For example, interface 202 comprises an interface for receiving data, providing data, receiving a request for data, etc. Processor 204 comprises a processor for executing applications 206. Applications 206 comprise data storage application 208, data retrieval application 210, and other applications 212. For example, data storage application 208 comprises an application for storing data in database data 216 and data retrieval application 210 comprises an application for retrieving data from database data 216. Other applications 212 comprises any other appropriate applications (e.g., a communications application, a chat application, a web browser application, a document preparation application, a report preparation application, a user interface application, a data analysis application, etc.). Storage 214 comprises database data 216 (e.g., human resources system data, financial system data, log data, data in a tabular format, user data, behavior data, etc.). In some embodiments, storage 214 comprises a distributed data storage system (e.g., an HDFS system). Storage 214 additionally comprises schema transformation data 218 (e.g., data describing transformations for transforming data from a first schema to a second schema) and data access rules 220 (e.g., temporary schema update transformations, data censoring rules, data correction rules, data location rules, etc.). A transformation of schema transformation data 218 comprises a transformation for removing data, repairing data, normalizing data, etc.; a data field addition, a data field removal, a data field mutation, or a data field type change, etc. For example, the set of transformations of schema transformation data 218 and the set of data access rules of data access rules 220 comprise a metadata model. The metadata model includes one or more database data source indicators (e.g., as part of data access rules 220). Memory 222 comprises executing application data 224 comprising data associated with applications 206.

Figure 3:
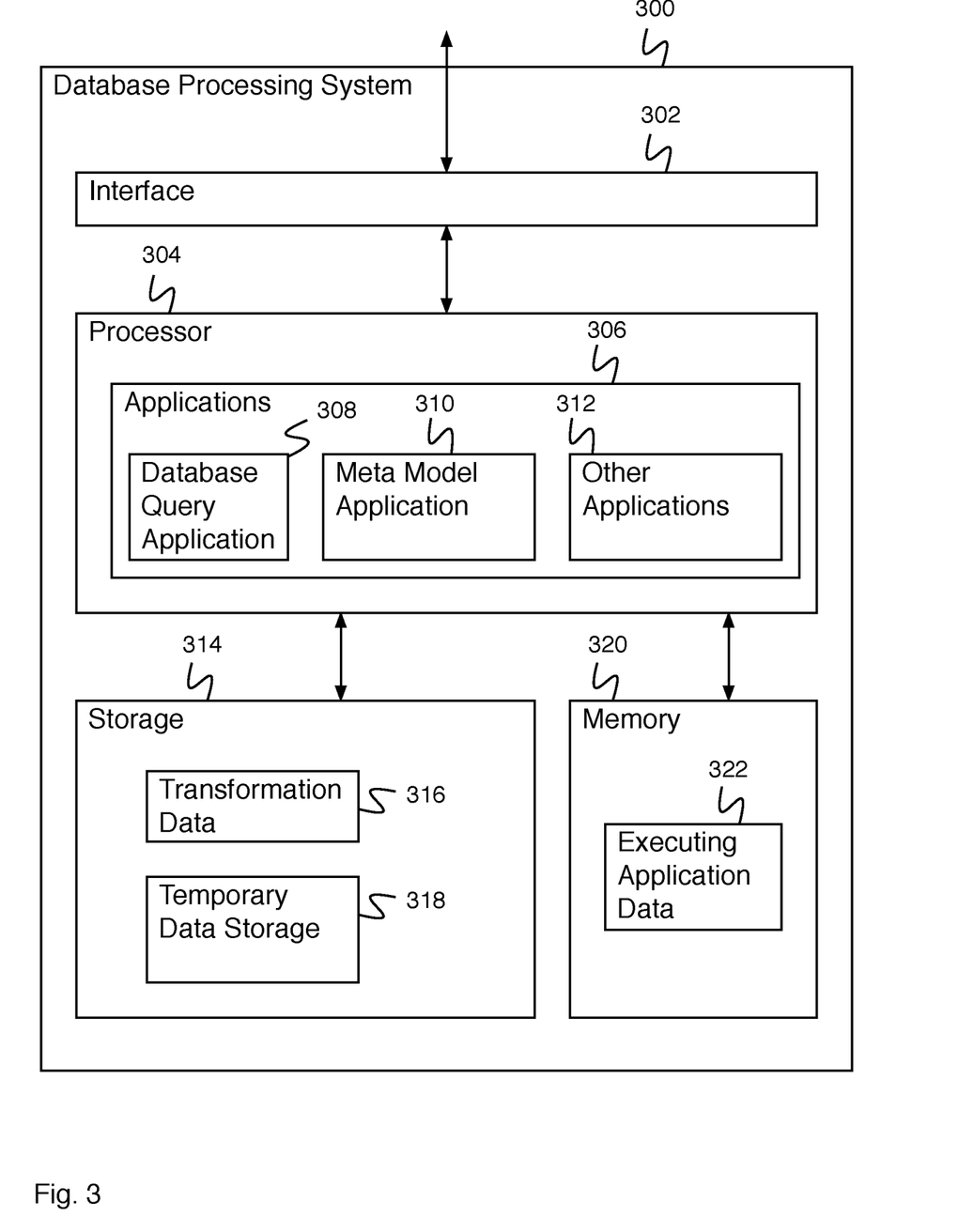
FIG. 3 is a block diagram illustrating an embodiment of a database processing system.

FIG. 3 is a block diagram illustrating an embodiment of a database processing system. In some embodiments, database processing system 300 comprises database processing system 106 of FIG. 1. In the example shown, database processing system 300 comprises interface 302. For example, interface 302 comprises an interface for receiving database data, receiving a database query, receiving a schema transformation, providing query results, etc. Processor 304 comprises a processor for executing applications 306. Applications 306 comprises database query application 308, meta model application 310, and other applications 312. For example, meta model application 310 comprises an application for determining a set of data access rules, collecting database data using the data access rules, determining a set of transformations for transforming data to a common schema, transforming data using the set of transformations, storing transformed data (e.g., using temporary data storage 318), etc. For example, meta model application 310 interacts with a metadata model stored by a database system. In some embodiments, meta model application 310 is implemented using Apache Spark. Database query application 308 comprises an application for querying database data (e.g., data stored in temporary data storage 318 or on database system 108 of FIG. 1). In some embodiments, database query application 308 is implemented using Apache Hive and/or Apache Spark. Other applications 312 comprise any other appropriate applications (e.g., a communications application, a chat application, a web browser application, a document preparation application, a report preparation application, a user interface application, a data analysis application, etc.). In some embodiments, applications 306 implement a process for processing database data comprising receiving a query for database data that includes a date range and a data selection criterion, determining a set of fields of the database data corresponding to a most recent date of the date range, determining a subset of the set of fields of the database data specified by the data selection criterion, determining a set of transformations, wherein each transformation of the set of transformations corresponds to a field of the subset and a sub-range of the date range, transforming database data to determine transformed database data using the set of transformations, and selecting data from the transformed database data using the data selection criterion to determine a query response. Storage 314 comprises transformation data 316 and temporary data storage 318. Transformation data 316 comprises a set of transformations wherein each transformation is associated with a sub-range of a date range and a field of a set of fields, transformation data received from database system 108 of FIG. 1, etc. Temporary data storage 318 comprises temporary data storage of transformed data. Temporary data storage 318 stores data for query by database query application 308. Memory 320 comprises executing application data 322 comprising data associated with applications 306.

Figure 4:
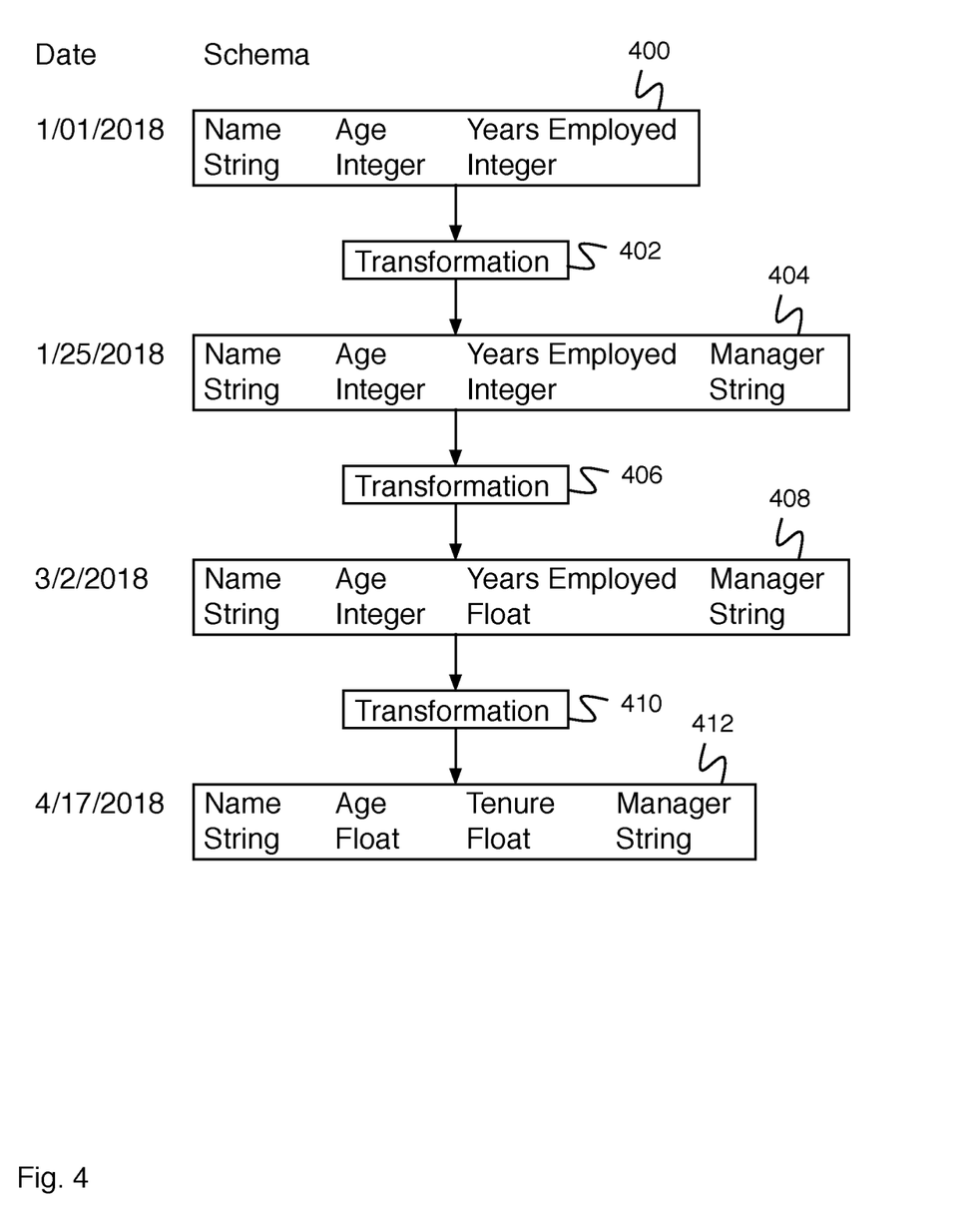
FIG. 4 is a diagram illustrating an embodiment of a set of schema update transformations.

FIG. 4 is a diagram illustrating an embodiment of a set of schema update transformations. In some embodiments, the set of schema update transformations of FIG. 4 is applied to data stored in database system 108 of FIG. 1. For example, database data is associated with a schema at a date, and database data associated with a first date is associated with a first schema and database data associated with a second date is associated with a second schema. For example, a transformation of a set of transformations comprises a transformation for transforming a field of a first schema to a corresponding field of a second schema. In the example shown, schema 400 comprises an initial schema for database data. Schema 400 comprises three fields, a field title Name of type String, a field titled Age of type Integer, and a field titled Years Employed of type Integer. Schema 400 comprises a schema for an employee database. Schema 400 takes effect as of Jan. 1, 2018. On Jan. 25, 2018 the database schema is updated to schema 404. Schema 404 comprises the fields of schema 400 and additionally includes a fourth field with title Manager and type String. For example, the schema change is performed by a system administrator using administrator system 104. When the schema is updated from schema 400 to schema 404, transformation 402 is added to the database system. Schema transformation 402 comprises a transformation for transforming data recorded with schema 400 to data recorded with schema 404. For example, schema transformation 402 comprises a function for adding a field with title Manager and data comprising a blank string. In some embodiments, database system 108 comprises or is in communication with a system including a manager name function for identifying a manager name based on an employee name. Schema transformation 402 includes a call to the manager name function for adding manager name data to the field with title Manager. On Mar. 2, 2018 the database schema is updated to schema 408. Schema 408 comprises the fields of schema 404 wherein the field with title Years Employed is changed from an integer to a float. Transformation 406 comprises a transformation for transforming data of schema 404 to data of schema 408, comprising a data type change function to change years employed data from integer to float. On Apr. 17, 2018 the database schema is changed to schema 412. Schema 412 comprises the fields of schema 408, wherein the field with title Age is changed from an integer to a float and wherein the field with title Years Employed is changed to have title Tenure. Transformation 410 comprises a transformation for transforming data of schema 408 to data of schema 412, comprising a data type change function to change age data from integer to float and a name change function to change the name Years Employed to the name Tenure.

In various embodiments, the transformations for a given data field and between a set of schema are determined for specific fields are combined or processed in series, or any other appropriate combination of transforms and processing. For example, for a search that addresses data in schema between Jan. 25, 2018 to after Apr. 17, 2018 that is interested in the years employed would transform data stored in schema Jan. 25, 2018 from "years employed" integer to "tenure" float directly or serially by using the two step process of changing from "years employed" integer to "years employed" float and then to "tenure" float. For that search, the data stored in schema Mar. 2, 2018 is transformed to "tenure" float from "years employed" float.

Figure 5:
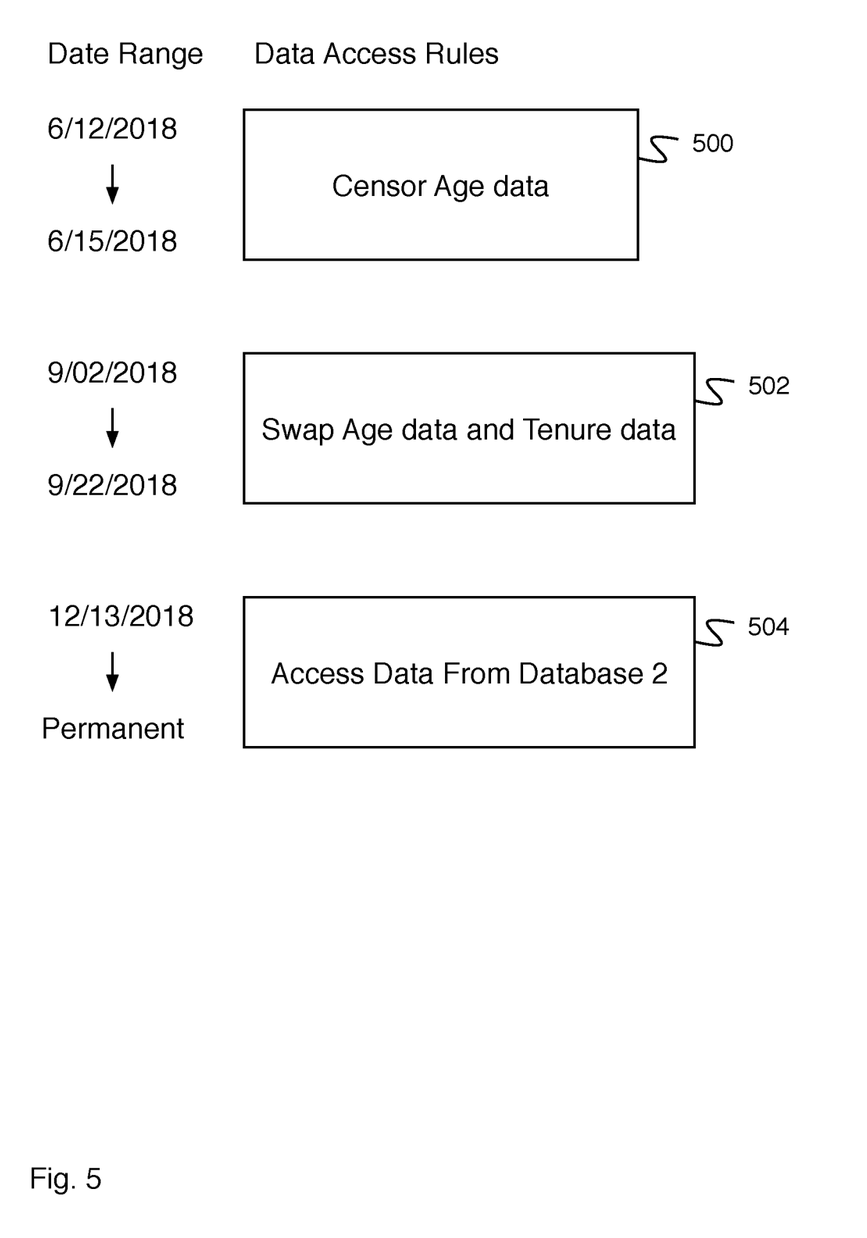
FIG. 5 is a diagram illustrating an embodiment of a set of data access rules.

FIG. 5 is a diagram illustrating an embodiment of a set of data access rules. In some embodiments, the data access rules of FIG. 5 comprise rules for accessing data stored in database system 108 of FIG. 1. For example, rules for accessing data comprise temporary schema update transformations, data censoring (e.g., in the event data that should not be accessed is stored in the database), data corrections (e.g., in the event incorrect data is stored in the database), data location rules (e.g., indicating a data physical storage location), etc. In the example shown, the data access rules of FIG. 5 comprise three data access rules. Data access rule 500 indicates that for data associated with a date from Jun. 12, 2018 to Jun. 15, 2018 data in the Age field should be censored (e.g., not provided in data searches—for example, because private data has accidentally been stored in the Age field). Data access rule 502 indicates that for data associated with a date from Sep. 2, 2018 to Sep. 22, 2018, data in the Age field and data in the Tenure field should be swapped (e.g., because the data was stored incorrectly). Data access rule 504 indicates that for data associated with a date of Dec. 13, 2018 and later, the data should be accessed in database 2 (e.g., because the storage location has changed from a previous storage location).

Figure 6:
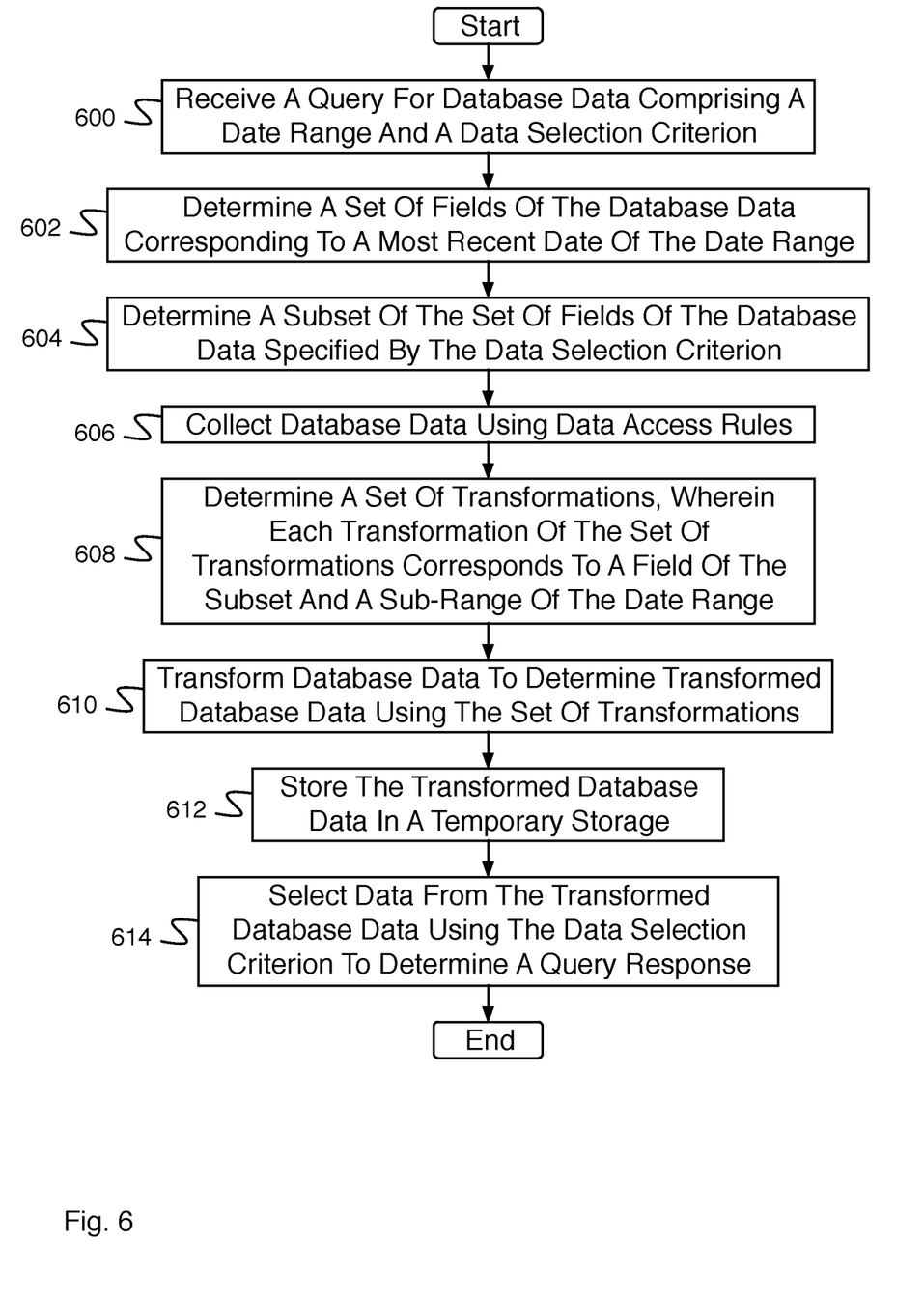
FIG. 6 is a flow diagram illustrating an embodiment of a process for processing database data.

FIG. 6 is a flow diagram illustrating an embodiment of a process for processing database data. In some embodiments, the process of FIG. 6 is executed by a database processing system (e.g., database processing system 106 of FIG. 1). In the example shown, in 600, a query comprising a date range and a data selection criterion is received. In 602, a set of fields of the database data corresponding to a most recent date of the date range is determined. In 604, a subset of the set of fields of the database data specified by the data selection criterion is determined. In 606, database data is collected using data access rules. In 608, a set of transformations is determined, wherein each transformation of the set of transformations corresponds to a field of the subset and a sub-range of the date range. In 610, database data is transformed to determine transformed database data using the set of transformations. For example, database data is transformed using the transformation for transforming data of a field of the subset from a date within the sub-range of the date range to the field of the subset at the most recent date of the date range, or transforming database data to determine transformed database data using the set of transformations comprises applying a sequential set of transformations in sequence to the data of the field of the subset. For example, all data of fields of the subset, of dates within the date range are transformed (e.g., some data of the subset of fields within the date range are transformed using the identity transformation). In some embodiments, the data are transformed in parallel or transformed in real-time. In 612, the transformed database data is stored in a temporary storage. In 614, data is selected from the transformed database data using the data selection criterion to determine a query response.

Figure 7:
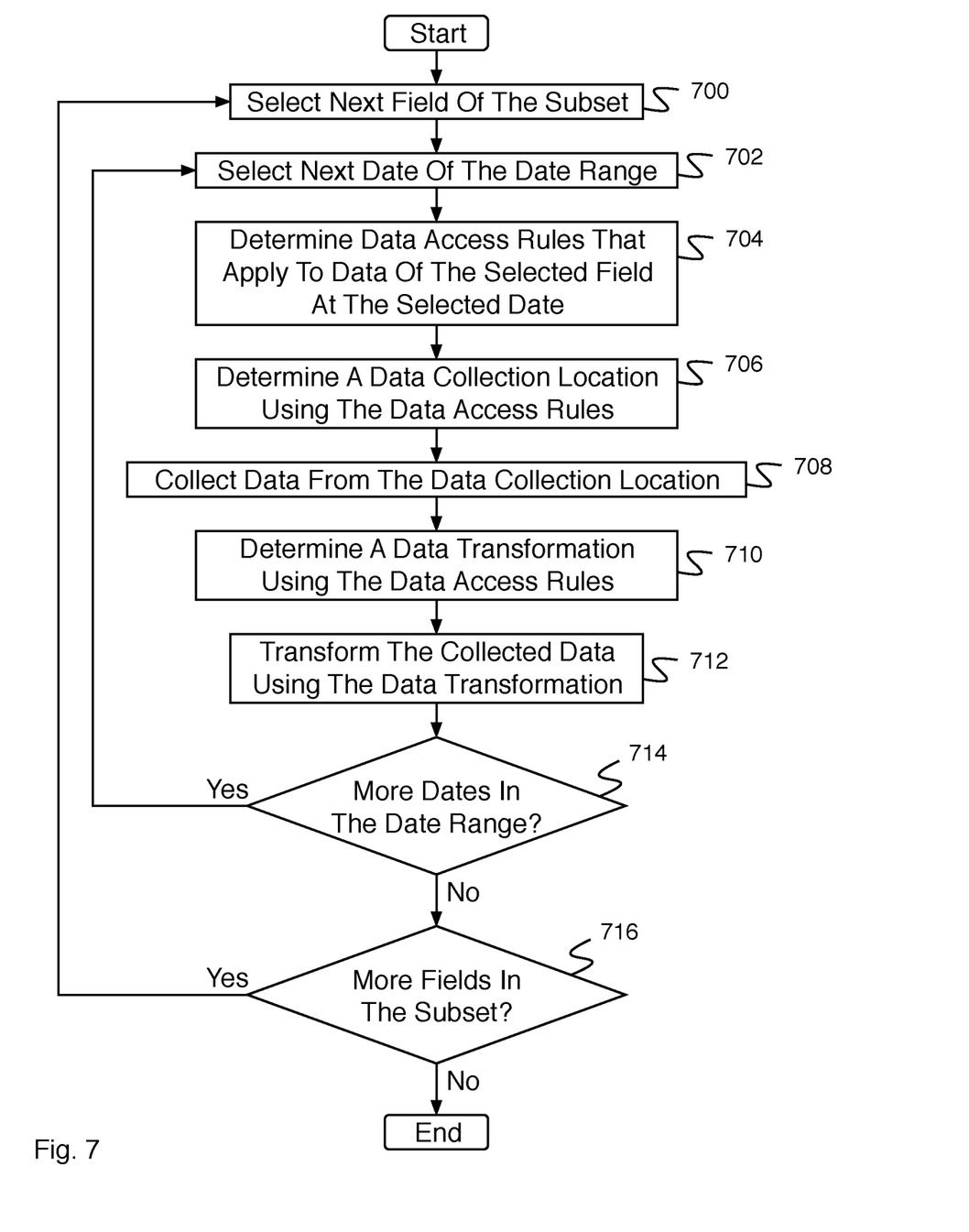
FIG. 7 is a flow diagram illustrating an embodiment of a process for collecting database data using data access rules.

FIG. 7 is a flow diagram illustrating an embodiment of a process for collecting database data using data access rules. In some embodiments, the process of FIG. 7 implements 606 of FIG. 6. In the example shown, in 700, a next field of the subset (e.g., of a subset of fields) is selected. In 702, a next date of the date range is selected. In 704, data access rules that apply to data of the selected field at the selected data are determined (e.g., from a set of data access rules, e.g., data access rules 220 of FIG. 2). In 706, a data collection location is determined using the data access rules. For example, a database system of one or more database systems for data collection is determined using the data access rules. In 708, data is collected from the data collection location. For example, data of the selected field at the selected date is collected from the data collection location. In 710, a data transformation is determined using the data access rules. For example, a data transformation comprises a temporary schema update transformation, a data censoring transformation, a data correction transformation, etc. In 712, the collected data is transformed using the data transformation. In 714, it is determined whether there are more dates in the date range. In the event it is determined that there are more dates in the date range, control passes to 702. In the event it is determined that there are not more dates in the date range, control passes to 716. In 716, it is determined whether there are more fields in the subset. In the event it is determined that there are more fields in the subset, control passes to 700. In the event it is determined that there are not more fields in the subset, the process ends.

Figure 8:
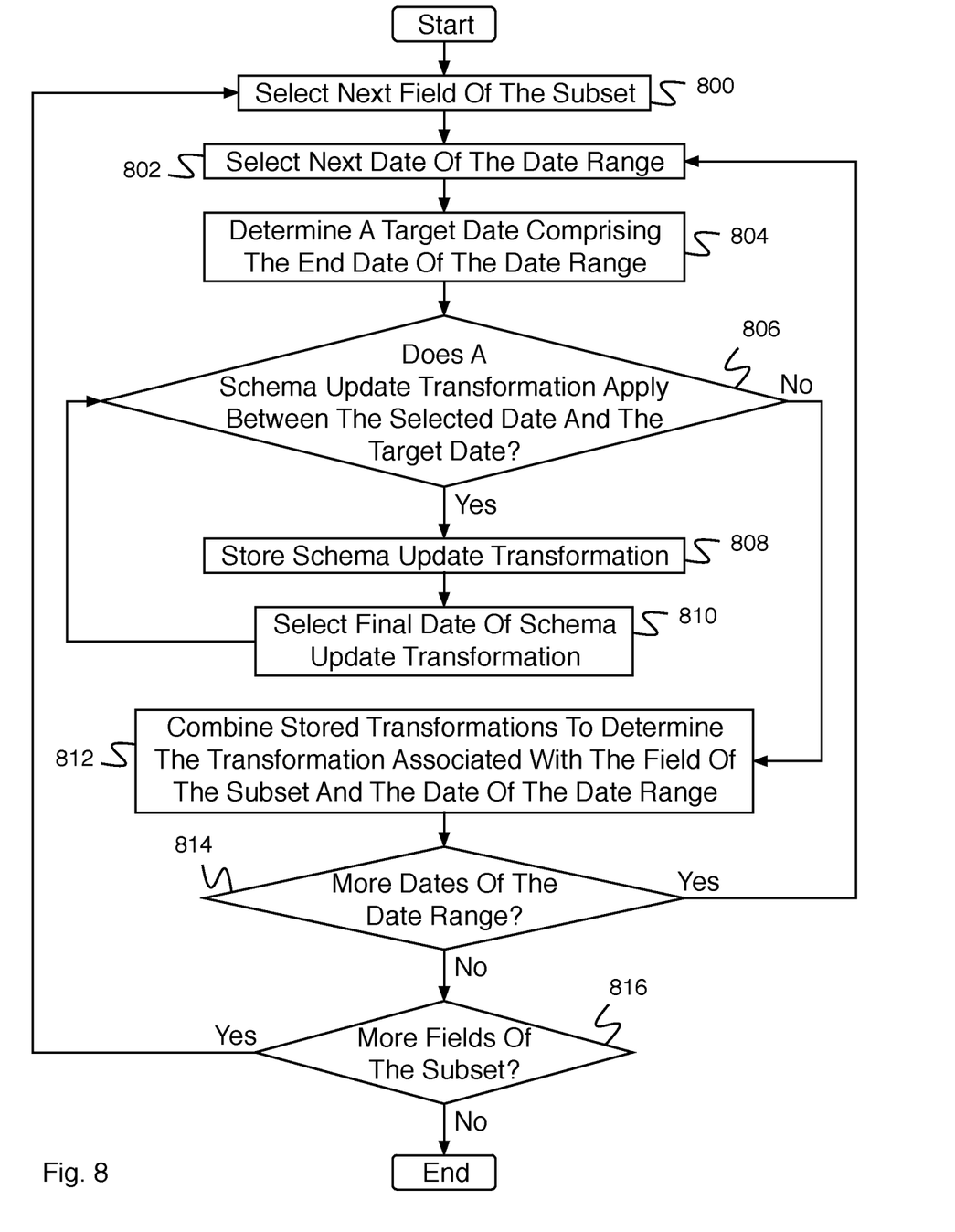
FIG. 8 is a flow diagram illustrating an embodiment of a process for determining a set of transformations, wherein each transformation of the set of transformations corresponds to a field of the subset and a sub-range of the date range.

FIG. 8 is a flow diagram illustrating an embodiment of a process for determining a set of transformations, wherein each transformation of the set of transformations corresponds to a field of the subset and a sub-range of the date range. In some embodiments, the process of FIG. 8 implements 608 of FIG. 6. In the example shown, in 800, a next field of the subset is selected. In 802, a next date of the date range is selected. In some embodiments, the next date of the date range comprises the first date of the date range. For example, the next date of the date range comprises the next date after the next schema update takes effect (e.g., the transformation associated with the field of the subset and with a set of dates with a consistent schema comprises a single transformation and the set of dates comprises a sub-range of the date range). In 804, a target date comprising the end date of the date range is determined. In 806, it is determined whether a schema update transformation applies between the selected date and the target date. In some embodiments, determining whether a schema update transformation applies between the selected date and the target date comprising querying a set of schema transformation data (e.g., schema transformation data 218 of FIG. 2). In the event it is determined that a schema update transformation does not apply between the selected date and the target date, control passes to 812. In the event it is determined that a schema update transformation applies between the selected date and the target date, control passes to 808. In 808, the schema update transformation is stored. In 810, the final date of the schema update transformation (e.g., the date when a next schema update transformation is added) is selected. Control then passes to 806. In 812, stored transformations are combined to determine the transformation associated with the field of the subset. For example, the transformation associated with the field of the subset comprises the transformation for transforming data of the field of the subset from the selected date within the sub-range of the date range to the field of the subset at the most recent date of the date range. For example, determining the transformation of the set of transformations comprises determining a sequential set of transformations associated with the field of the subset (e.g., the sequential set of determined in the repeated execution of 806), wherein each transformation of the sequential set of transformations transforms data of the field at a date to data of the field at a later date, wherein the transformation of the set of transformations comprises the sequential set of transformations combined in sequence (e.g., combined in the execution of 812).

In 814, it is determined whether there are more dates of the date range. In the event it is determined that there are more dates of the date range, control passes to 802. In the event it is determined that there are not more dates of the date range, control passes to 816. In 816, it is determined whether there are more fields of the subset. In the event it is determined that there are more fields of the subset, control passes to 800. In the event it is determined that there are not more fields of the subset, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for processing database data, comprising:
   an interface configured to:
      receive a query for the database data comprising a date range and a data selection criterion; and
   a processor configured to:
      determine a set of fields of the database data corresponding to a schema of the database data at a most recent date of the date range;
      determine a subset of the set of fields of the database data specified by the data selection criterion;
      determine a set of transformations, wherein each transformation of the set of transformations corresponds to a field of the subset and a sub-range of the date range, comprising to:
         determine whether a schema update transformation applies between a next date and a target date, wherein the next date includes a first date of the date range, and wherein the target date includes the end date of the date range; and
         in response to a determination that the schema update transformation does not apply between the next date and the target date, omit including the schema update transformation in the set of transformations;
      collect data from the database data using one or more data access rules associated with the subset of the set of fields and the data range to obtain collected database data;
      transform the collected database data using the set of transformations to determine transformed database data, wherein the transformed database data comprises a consistent schema corresponding to the schema of the database data at the most recent date of the date range; and
      select data from the transformed database data using the data selection criterion to determine a query response.

2. The system of claim 1, wherein a transformation of the set of transformations comprises the transformation for transforming data of the field of the subset from a date within the sub-range of the date range to the field of the subset at the most recent date of the date range.

3. The system of claim 2, wherein the transformation is determined based at least in part on a schema associated with a date associated with a specific portion of the database data.

4. The system of claim 1, wherein determining a transformation of the set of transformations comprises determining a sequential set of transformations associated with the field of the subset, wherein each transformation of the sequential set of transformations transforms data of the field at a date to data of the field at a later date, wherein the transformation of the set of transformations comprises the sequential set of transformations combined in sequence.

5. The system of claim 1, wherein transforming the database data to determine transformed database data using the set of transformations comprises applying a sequential set of transformations in sequence to the data of the field of the subset.

6. The system of claim 1, wherein all data of fields of the subset and of dates within the date range are transformed.

7. The system of claim 6, wherein the data are transformed in parallel or transformed in real-time.

8. The system of claim 1, wherein the database data is associated with a schema at a date.

9. The system of claim 8, wherein the database data associated with a first date is associated with a first schema and the database data associated with a second date is associated with a second schema.

10. The system of claim 9, wherein a transformation of the set of transformations transforms a field of the first schema to a corresponding field of the second schema.

11. The system of claim 1, wherein a transformation of the set of transformations removes data, repairs data, or normalizes data.

12. The system of claim 1, wherein a transformation of the set of transformations comprises a data field addition, a data field removal, a data field mutation, or a data field type change.

13. The system of claim 1, wherein the set of transformations is stored as a metadata model.

14. The system of claim 13, wherein the metadata model includes one or more database data source indicators.

15. The system of claim 1, wherein the database data is stored using a Hadoop system.

16. The system of claim 1, wherein the database data is transformed using a Spark system.

17. The system of claim 1, wherein the database data comprises log data.

18. The system of claim 1, wherein the database data comprises data in a tabular format.

19. The system of claim 1, wherein determining whether a schema update transformation applies between a next date and a target date comprises to query a set of schema transformation data.

20. A method for processing database data, comprising:
   receiving a query for the database data comprising a date range and a data selection criterion;
   determining, using a processor, a set of fields of the database data corresponding to a schema of the database data at a most recent date of the date range;
   determining a subset of the set of fields of the database data specified by the data selection criterion;

determining a set of transformations, wherein each transformation of the set of transformations corresponds to a field of the subset and a sub-range of the date range, comprising:
  determining whether a schema update transformation applies between a next date and a target date, wherein the next date includes a first date of the date range, and wherein the target date includes the end date of the date range; and
  in response to a determination that the schema update transformation does not apply between the next date and the target date, omitting to include the schema update transformation in the set of transformations;
collecting data from the database data using one or more data access rules associated with the subset of the set of fields and the data range to obtain collected database data;
transforming the collected database data using the set of transformations to determine transformed database data, wherein the transformed database data comprises a consistent schema corresponding to the schema of the database data at the most recent date of the date range; and
selecting data from the transformed database data using the data selection criterion to determine a query response.

21. A computer program product for processing database data, the computer program product being embodied in a non-transitory computer readable storage medium and comprising computer instructions for:
  receiving a query for the database data comprising a date range and a data selection criterion;
  determining a set of fields of the database data corresponding to a schema of the database data at a most recent date of the date range;
  determining a subset of the set of fields of the database data specified by the data selection criterion;
  determining a set of transformations, wherein each transformation of the set of transformations corresponds to a field of the subset and a sub-range of the date range, comprising:
    determining whether a schema update transformation applies between a next date and a target date, wherein the next date includes a first date of the date range, and wherein the target date includes the end date of the date range; and
    in response to a determination that the schema update transformation does not apply between the next date and the target date, omitting to include the schema update transformation in the set of transformations;
  collecting data from the database data using one or more data access rules associated with the subset of the set of fields and the data range to obtain collected database data;
  transforming the collected database data using the set of transformations to determine transformed database data, wherein the transformed database data comprises a consistent schema corresponding to the schema of the database data at the most recent date of the date range; and
  selecting data from the transformed database data using the data selection criterion to determine a query response.

* * * * *